Patented June 18, 1935

2,005,500

UNITED STATES PATENT OFFICE 2,005,500

SEPARATION AND RECOVERY OF OLEFINES FROM GASES CONTAINING THE SAME

Walter Philip Joshua, Cheam, and Herbert Muggleton Stanley, Tadworth, England

No Drawing. Application January 7, 1935, Serial No. 798. In Great Britain January 26, 1934

12 Claims. (Cl. 260—170)

This invention relates to the removal of olefine gases, particularly ethylene, from gas mixtures and particularly to the separation of olefines from saturated hydrocarbon gases and other gases by washing with certain aqueous cuprous salt solutions having a preferential solvent action on the olefines.

Since cuprous salts are practically insoluble in water alone, it has been customary in the past to employ cuprous salts such as cuprous chloride either (1) in concentrated aqueous hydrochloric acid solution or (2) in ammoniacal solution. The use of acid solutions is to be avoided in large scale practice whilst ammoniacal solutions suffer from the disadvantage that, during the regeneration of the dissolved olefine by heating the solution ammonia is lost owing to its high volatility. Thus the recovery of the ammonia and the restoration of the absorbent solution to the necessary ammonia concentration requires special procedure and apparatus and any method of obviating such troublesome recovery represents an important technical advance.

We have found that aqueous solutions of cuprous salts, such as cuprous chloride and cuprous formate, having a very high solvent action on ethylene and its higher homologues may be prepared by the use of one or more of the bases of the hydroxyalkylamine group, such as monoethanolamine, diethanolamine, propanolamines and butanolamines, in place of ammonia. Besides water and the base it is desirable to have present in the solution a certain amount of a salt of the base, say up to about 1 molecule of the salt per atom of cuprous copper; such salts as the hydrochlorides or the formates of hydroxyalkylamines are suitable.

The advantage in the use of the above bases for preparing homogeneous solutions of cuprous salts for the absorption of olefines lies in the fact that, owing to the relatively non-volatile character of the base or bases employed, little or no loss of basic material takes place during the regeneration of the olefines by heating the solution. Solutions of cuprous salts in aqueous hydroxyalkylamines containing proportions of hydroxyalkylamine salts are stable in the absence of air or oxygen and can be used repeatedly for the absorption of olefines without appreciable deterioration.

In carryinge out the invention it is advisable to treat the gas mixture containing the desired olefine in any known manner for the removal of traces of acetylene before subjection to the main absorption process. The absorption may be effected at atmospheric pressure or at pressure greater than atmospheric and either batchwise or continuously on the counter-current principle, but preferably under pressure in a counter-current tower. It is also preferable to operate at a low temperature and as the absorption of the olefines in the cuprous solutions is exothermic it is advisable, especially in the case of treating gas mixtures rich in olefines, to provide for internal or external cooling of the reactants in the tower or other absorption apparatus.

After absorption, the olefines may be recovered in any known manner, such as for example, by heating the solution or by reducing the pressure or by both.

A satisfactory hydroxy-alkylamine cuprous salt solution (hereinafter referred to as solution A) may be prepared by dissolving 100 grams of cuprous chloride in a mixture of 300 grams of water, 75 ccs. of hydrochloric acid of density 1.16, and 200 grams of monoethanolamine.

The following is a table of the solubilities of various gases in the above-mentioned solution A at a number of pressures, the amounts absorbed in the solvent at 20° C. being expressed in litres of gas measured at normal temperature and pressure per kilogram of solvent:—

| Gas | Solubility at absolute pressures of: | | | |
|---|---|---|---|---|
|  | 1 at. | 5 ats. | 10 ats. | 20 ats. |
| Ethylene | 8.4 | 15.8 | 21.2 | 24.2 |
| Propylene | 1.1 | 4.3 | 6.1 |  |
| Butylene | 1.0 |  |  |  |
| 1:3-Butadiene | 11 |  |  |  |
| Hydrogen |  |  | 0.08 | 0.17 |

Other hydroxy-alkylamine cuprous salt solutions may be used, the solubilities of ethylene and propylene in such solvents being of the same order as those above given. Thus, the solubility of ethylene at a pressure of 11 atmospheres absolute in a solution of 100 grams of cuprous chloride in a mixture of 300 grams of water, 75 cc. concentrated hydrochloric acid (density 1.16) and 250 grams of monopropanolamine, is 21.6 litres (measured at normal temperature and pressure) per kilogram of solvent at 20° C.

As might be expected the solubility of all the olefinic gases in these cuprous solutions diminishes rapidly with rising temperature.

The following are three examples of carrying out the invention in specific cases:—

Example I. A batch adsorption 49.3 litres (measured at normal temperature and pressure of a gas mixture of the composition $C_3H_6$, 17.6 per cent; $C_2H_4$, 35.7 per cent; $H_2$, 14.1 per cent; $C_2H_6$, 3.0 per cent; $CH_4$, 29.1 per cent, and $N_2$, 0.5 per cent; were raised to a pressure of about 22 atmospheres and contacted in a suitable pressure vessel with 1.92 kilos of solution A hereinbefore referred to. The vessel was agitated thoroughly at a temperature of 20° C., and the pressure in the container fell to 11.9 atmospheres. The volume of the undissolved gas was 27.1 litres which had the composition $C_3H_6$, 17.5 per cent; $C_2H_4$, 14.1 per cent; $H_2$, 18.8 per cent; $CH_4$, 45.6 per cent; and $C_2H_6$, 4.0 per cent. The gas recovered from the wash liquor by blowing down to atmospheric pressure and warming to 60° C. measured 22.2 litres (at normal temperature and pressure) and had the composition $C_3H_6$, 17.8 per cent; $C_2H_4$, 80.8 per cent; $CH_4$, 1.0 per cent; and a residue of ethane and hydrogen 0.4 per cent.

Example II. A batch adsorption 64.6 litres of a gas (measured at normal temperature and pressure) of the same composition as that used in Example I and under a pressure of about 31 atmospheres were batch treated with 2.20 kilos of solution A at about 20° C., the final pressure being 19.4 atmospheres. The volumes and volumetric compositions of the undissolved gas and of the absorbed gas after recovery from the wash liquid were as follows:—

|  | Undissolved gas | Dissolved gas |
|---|---|---|
| Volume, litres | 40.2 | 24.4 |
| Composition per cent. vol.: |  |  |
| $C_3H_6$ | 16.3 | 20.4 |
| $C_2H_4$ | 9.6 | 77.5 |
| $CH_4$ | 48.0 | 1.2 |
| $C_2H_6$ | 4.0 | 0.9 |
| $H_2$ | 22.2 |  |

Example III. Counter current operation in a washing tower

A raw cracking gas was compressed to 30 atmospheres and the components condensed to liquid form by cooling to 20° C. were separated off while small amounts of acetylene were then removed by a suitable washing process. The resulting gas mixture contained in round numbers, $C_3H_6$, 20 per cent; $C_2H_4$, 35 per cent; $C_4H_8$, 4 per cent; 1:3-butadiene, 1 per cent; $H_2$, 12 per cent; $CH_4$, 23 per cent; $C_2H_6$, 4 per cent; and a residue of carbon monoxide and nitrogen (1 per cent); this was scrubbed in a suitable packed column under a pressure of 30 atmospheres on the counter-current principle with a stream of solution A, employing about 40 kilos of the absorbent solution for each cubic metre of gas washed. The tower was suitably cooled so as to dissipate the heat of solution, the average temperature being 20° C. The gases recovered from the wash liquor by letting down the pressure to atmospheric and warming to 60° C. had the following approximate composition—CO, 1 per cent; $C_3H_6$, 26 per cent; $C_2H_4$, 65 per cent; $C_4H_8$, 4 per cent; 1:3-butadiene, 2 per cent; and a residue of 2 per cent. of hydrogen, methane and ethane. Approximately 50 litres of this gas were obtained from each 100 litres of raw gas washed.

What we claim is:—

1. The process of removing olefines from gas mixtures containing same consisting in absorbing the olefine in a solution of a cuprous salt in an aqueous hydroxy-alkylamine.

2. The process of removing olefines from gas mixtures containing same consisting in absorbing the olefine in a solution of a cuprous salt in an aqueous hydroxy-alkylamine containing also a small amount of a water soluble salt of the hydroxy-alkylamine.

3. The process of removing olefines from gas mixtures containing same consisting in absorbing the olefine in a solution of a cuprous salt in an aqueous hydroxy-alkylamine containing also an amount of a water-soluble salt of the hydroxy-alkylamine equal to about one molecule per atom of cuprous copper.

4. The process of removing olefines from gas mixtures containing same consisting in absorbing the olefine in a solution of a cuprous salt in an aqueous hydroxy-alkylamine under super-atmospheric pressure.

5. The process of removing olefines from gas mixtures containing same consisting in absorbing the olefine in a solution of a cuprous salt in an aqueous hydroxy-alkylamine and preventing a substantial rise in temperature of the liquid during absorption notwithstanding the exothermic nature of the action.

6. The process of removing olefines from gas mixtures containing same consisting in absorbing the olefine in a solution of a cuprous salt in an aqueous hydroxy-alkylamine on the counter-current principle.

7. The process of removing olefines from gas mixtures containing same consisting in absorbing the olefine in a liquid comprising essentially a solution of a cuprous salt in water and monoethanolamine.

8. The process of obtaining olefines from gas mixtures containing same consisting in absorbing the olefine in a solution of a cuprous salt in an aqueous hydroxy-alkylamine and then removing the absorbed olefine from the solution by heating the solution to drive off the olefine.

9. The process of obtaining olefines from gas mixtures containing same consisting in absorbing the olefines in a solution of a cuprous salt in an aqueous hydroxy-alkylamine and then removing the absorbed olefine from the solution by subjecting the solution to reduced pressure to cause spontaneous liberation of the olefine.

10. The process of obtaining olefines from gas mixtures containing same consisting in absorbing the olefine in a solution of a cuprous salt in an aqueous hydroxy-alkylamine and then removing the absorbed olefine from the solution by heating the solution and subjecting it to reduced pressure.

11. The process of removing olefines from gas mixtures containing same and acetylene, consisting in first removing the acetylene and then subjecting the acetylene-free gases to the olefine-absorbing action of a solution of a cuprous salt in an aqueous hydroxy-alkylamine.

12. The process of removing olefines from gas mixtures containing same and acetylene, consisting in first removing the acetylene and then subjecting the acetylene-free gases to the olefine-absorbing action of a solution of a cuprous salt in an aqueous hydroxy-alkylamine containing also a small amount of a water soluble salt of the hydroxy-alkylamine.

WALTER PHILIP JOSHUA.
HERBERT MUGGLETON STANLEY.